(12) United States Patent
Sakata

(10) Patent No.: US 9,420,489 B2
(45) Date of Patent: Aug. 16, 2016

(54) COMMUNICATION DEVICE, COMMUNICATION SYSTEM, AND COMMUNICATION METHOD

(75) Inventor: Masayuki Sakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 289 days.

(21) Appl. No.: 13/979,694

(22) PCT Filed: Jan. 16, 2012

(86) PCT No.: PCT/JP2012/050748
§ 371 (c)(1),
(2), (4) Date: Jul. 15, 2013

(87) PCT Pub. No.: WO2012/105305
PCT Pub. Date: Aug. 9, 2012

(65) Prior Publication Data
US 2013/0301406 A1    Nov. 14, 2013

(30) Foreign Application Priority Data

Jan. 31, 2011 (JP) ................................ 2011-018532

(51) Int. Cl.
| | |
|---|---|
| G08C 15/00 | (2006.01) |
| H04W 28/02 | (2009.01) |
| G08G 1/09 | (2006.01) |
| H04W 4/02 | (2009.01) |
| G08G 1/16 | (2006.01) |
| H04B 7/155 | (2006.01) |

(Continued)

(52) U.S. Cl.
CPC ............ *H04W 28/0226* (2013.01); *G08G 1/092* (2013.01); *G08G 1/093* (2013.01); *G08G 1/162* (2013.01); *H04B 7/15507* (2013.01); *H04L 12/6418* (2013.01); *H04W 4/025* (2013.01); *H04W 4/046* (2013.01); *H04L 67/12* (2013.01); *H04W 28/06* (2013.01); *H04W 64/006* (2013.01); *H04W 84/18* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 6,728,629 | B2 * | 4/2004 | Oka et al. ................. | 701/516 |
| 8,410,956 | B2 * | 4/2013 | Bai et al. ................. | 340/905 |

(Continued)

FOREIGN PATENT DOCUMENTS

| | | |
|---|---|---|
| EP | 1755094 A1 | 2/2007 |
| EP | 1788749 A1 | 5/2007 |

(Continued)

OTHER PUBLICATIONS

Communication dated Feb. 25, 2015 from the European Patent Office in counterpart application No. 12742719.3.

*Primary Examiner* — Phirin Sam
(74) *Attorney, Agent, or Firm* — Sughrue Mion, PLLC

(57) ABSTRACT

An object of the present invention is to forward a packet corresponding to trajectories of roads without it being necessary to use road trajectory information. A communication device is mounted on a vehicle. The communication device includes a reception section that receives a packet containing forwarding information that represents a transmission area of the packet that is set up based on a reference direction from a transmission source; an acquisition section that acquires a running direction of its own vehicle; and a processing section that transmits the packet containing the forwarding information to at least the transmission area of the packet that has been set up based on the running direction of its own vehicle.

10 Claims, 14 Drawing Sheets

(51) Int. Cl.
*H04W 4/04* (2009.01)
*H04L 12/64* (2006.01)
*H04W 64/00* (2009.01)
*H04W 88/04* (2009.01)
*H04W 28/06* (2009.01)
*H04W 84/18* (2009.01)
*H04L 29/08* (2006.01)

(56) References Cited

U.S. PATENT DOCUMENTS

| | | | |
|---|---|---|---|
| 2002/0035554 A1 | 3/2002 | Katsuno et al. | |
| 2005/0030202 A1* | 2/2005 | Tsuboi | 340/901 |
| 2005/0201316 A1 | 9/2005 | Fukuhara et al. | |
| 2007/0117525 A1* | 5/2007 | Osafune | 455/99 |
| 2007/0124063 A1 | 5/2007 | Kindo | |
| 2007/0171095 A1* | 7/2007 | Mochizuki | 340/995.13 |
| 2008/0088707 A1* | 4/2008 | Iwaki | G01S 13/931 348/208.1 |
| 2009/0048768 A1* | 2/2009 | Taguchi | 701/117 |
| 2010/0060480 A1* | 3/2010 | Bai et al. | 340/901 |
| 2010/0173603 A1* | 7/2010 | Kwak et al. | 455/404.1 |
| 2011/0035098 A1* | 2/2011 | Goto | G01C 21/3626 701/36 |
| 2011/0095909 A1* | 4/2011 | Kushi et al. | 340/905 |
| 2011/0128138 A1* | 6/2011 | Yamamoto et al. | 340/436 |
| 2011/0276220 A1* | 11/2011 | Sato | 701/33 |
| 2012/0028662 A1* | 2/2012 | Nagai et al. | 455/500 |
| 2012/0041669 A1* | 2/2012 | Zaitsu et al. | 701/117 |
| 2012/0116663 A1* | 5/2012 | Tsunekawa | 701/300 |
| 2012/0176500 A1* | 7/2012 | Muto | H04N 7/18 348/148 |

FOREIGN PATENT DOCUMENTS

| | | |
|---|---|---|
| JP | 2001-339399 A | 12/2001 |
| JP | 2004-297237 A | 10/2004 |
| JP | 2005-045340 A | 2/2005 |
| JP | 2005-124014 A | 5/2005 |
| JP | 2005-244873 A | 9/2005 |
| JP | 2005-321860 A | 11/2005 |
| JP | 2007-214986 A | 8/2007 |
| JP | 2008-176370 A | 7/2008 |
| JP | 2010-287246 A | 12/2010 |

* cited by examiner

Fig.6

| Forwarding information (header portion) |
|---|
| Reference position (position of transmission source)  : Pb |
| Reference direction (running direction of transmission source) : Db |
| Transmission direction of packet  : Dr |
| Angle threshold  : $\theta t$ |
| Forwarding distance threshold  : Lt |
| Position of transmission source (latitude, longitude)  : P1 |
| ⋮ |

Road-to-vehicle, inter vehicle data portion

Fig.8

Packet transmitted from vehicle A
510

| Forwarding information (header portion) | |
|---|---|
| Reference position (position of transmission source) | : P1 |
| Reference direction (running direction of transmission source) | : D1 |
| Transmission direction of packet (forward direction of vehicle) | : Df |
| Angle threshold | : $\theta t$ |
| Forwarding distance threshold | : Lt |
| Position of transmission source (latitude, longitude) | : P1 |
| ⋮ | |
| Road-to-vehicle, inter vehicle data portion | |

Packet transmitted from vehicle B
520

| Forwarding information (header portion) | |
|---|---|
| Reference position (position of transmission source) | : P2 |
| Reference direction (running direction of transmission source) | : D2 |
| Transmission direction of packet (forward direction of vehicle) | : Df |
| Angle threshold | : $\theta t$ |
| Forwarding distance threshold | : Lt |
| Position of transmission source (latitude, longitude) | : P1 |
| ⋮ | |
| Road-to-vehicle, inter vehicle data portion | |

Packet transmitted from vehicle C
530

| Forwarding information (header portion) | |
|---|---|
| Reference position (position of transmission source) | : P3 |
| Reference direction (running direction of transmission source) | : D3 |
| Transmission direction of packet (forward direction of vehicle) | : Df |
| Angle threshold | : $\theta t$ |
| Forwarding distance threshold | : Lt |
| Position of transmission source (latitude, longitude) | : P1 |
| ⋮ | |
| Road-to-vehicle, inter vehicle data portion | |

Fig. 10

| Forwarding information (header portion) |  |
|---|---|
| Reference position (position of transmission source) | : Pb |
| Reference direction (running direction of transmission source) | : Db |
| forwarding count value (number of forwarding times) | : Cv |
| Transmission direction of packet | : Dr |
| Angle threshold | : θt |
| Forwarding distance threshold | : Lt |
| Forwarding count threshold | : Ht |
| Position of transmission source (latitude, longitude) | : P1 |
| ⋮ |  |
| Road-to-vehicle, inter vehicle data portion | |

| Common header |||
|---|---|---|
| SN | LT | Reserved |
| SO PV |||
| Distance | Angle ||
| Direction | Reserved ||

Fig.11B

| Field # | Field name | Octet/bit position | | Type | Unit | Definition |
|---|---|---|---|---|---|---|
| | | Start | End | | | |
| 1 | Common header | Octet 0 | Octet 35 | Common header | n/a | Common header (Fig. 12) |
| 2 | SN | Octet 36 | Octet 37 | 16-bit unsigned integer | n/a | Sequence number |
| 3 | LT | Octet 38 | Octet 38 | 8-bit unsigned integer | n/a | Life type |
| 4 | Reserved | Octet 39 | Octet 39 | 8-bit unsigned integer | n/a | Reserved |
| 5 | SO PV | Octet 40 | Octet 67 | Long Position Vector | n/a | Long Position Vector (Fig. 13); Position information of transmission source |
| 6 | Distance | Octet 68 | Octet 69 | 8-bit unsigned integer | [m] | Transmission distance |
| 7 | Angle | Octet 70 | Octet 71 | 8-bit unsigned integer | [°] | Transmission range. Specify ±1 to ±90 degrees about orientation of transmission terminal. At ± 90 degrees, all forward directions or all reverse directions are specified. |
| 8 | Direction | Octet 72 | Octet 73 | 8-bit unsigned integer | n/a | Forward (0) or reverse (1). |
| 9 | Reserved | Octet 74 | Octet 75 | 8-bit unsigned integer | n/a | Not used |

Fig.12A

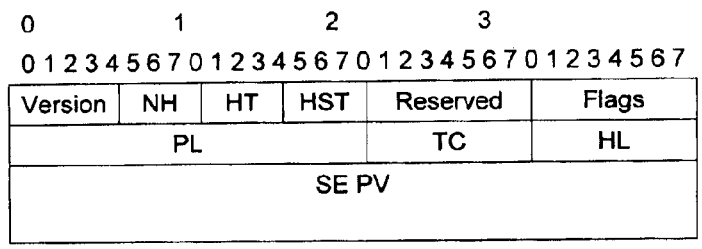

Fig.12B

| Field # | Field name | Octet/bit position | | Type | Unit | Definition |
|---|---|---|---|---|---|---|
| | | Start | End | | | |
| 1 | Version | Octet 0 Bit 0 | Octet 0 Bit 3 | 4 bit unsigned integer | n/a | Version |
| 2 | NH | Octet 0 Bit 4 | Octet 0 Bit 7 | 4 bit unsigned integer | n/a | Next header |
| 3 | HT | Octet 1 Bit 0 | Octet 1 Bit 0 | 4 bit unsigned integer | n/a | Header type |
| 4 | HST | Octet 1 Bit 4 | Octet 1 Bit 7 | 4 bit unsigned integer | n/a | Header sub type |
| 5 | Reserved | Octet 2 | Octet 2 | | n/a | Reserved |
| 6 | Flags | Octet 3 | Octet 3 | Bit field | n/a | |
| 7 | PL | Octet 4 | Octet 5 | 16 bit unsigned integer | [byte] | Payload length |
| 8 | TC | Octet 6 | Octet 6 | Four sub fields<br><br>1 bit unsigned integer,<br><br>3 bit unsigned integer,<br><br>2 bit selector,<br><br>2 bit selector | n/a | Traffic class |
| 9 | HL | Octet 7 | Octet 7 | 8 bit unsigned integer | [hops] | Hop limit |
| 10 | SE PV | Octet 8 | Octet 35 | Long Position Vector | n/a | Long Position Vector (Fig. 13); Position information of forwarding terminal |

Fig.13B

| Field # | Field name | Octet/bit position | | Type | Unit | Definition |
|---|---|---|---|---|---|---|
| | | Start | End | | | |
| 1 | GN_ADDR | Octet 0 | Octet 7 | 64 bit address | n/a | GN address |
| 2 | TST | Octet 8 | Octet 11 | 32 bit unsigned integer | [ms] | Time stamp |
| 3 | Lat | Octet 12 | Octet 15 | 32 bit unsigned integer | [1/10 micro degree] | Altitude |
| 4 | Long | Octet 16 | Octet 19 | 32 bit unsigned integer | [1/10 micro degree] | Longitude |
| 5 | S | Octet 20 | Octet 21 | 16 bit unsigned integer | [1/100 ms] | Speed |
| 6 | H | Octet 22 | Octet 23 | 16 bit unsigned integer | [1/10 degree] | Direction |
| 7 | Alt | Octet 24 | Octet 25 | 16 bit unsigned integer | [m] | Elevation |
| 8 | TAcc | Octet 26 Bit 0 | Octet 26 Bit 3 | 4 bit unsigned integer | n/a | Accuracy of time stamp |
| 9 | PosAcc | Octet 26 Bit 4 | Octet 26 Bit 7 | 4 bit unsigned integer | n/a | Angle of position |
| 10 | SAcc | Octet 27 Bit 0 | Octet 27 Bit 2 | 3 bit unsigned integer | n/a | Accuracy of speed |
| 11 | HAcc | Octet 27 Bit 3 | Octet 27 Bit 5 | 3 bit unsigned integer | n/a | Accuracy of direction |
| 12 | AltAcc | Octet 27 Bit 6 | Octet 27 Bit 7 | 2 bit unsigned integer | n/a | Accuracy of elevation |

COMMUNICATION DEVICE, COMMUNICATION SYSTEM, AND COMMUNICATION METHOD

CROSS REFERENCE TO RELATED APPLICATIONS

This application is a National Stage of International Application No. PCT/JP2012/050748 filed Jan. 16, 2012, claiming priority based on Japanese Patent Application No. 2011-018532 filed Jan. 31, 2011, the contents of all of which are incorporated herein by reference in their entirety.

TECHNICAL FIELD

The present invention relates to a communication device, a communication system, and a communication method.

BACKGROUND ART

In recent years, communication systems that notify vehicles that are running of safe driving support information that represents, for example, neighboring road conditions and neighboring vehicle running states through road-to-vehicle communication (between a road side unit and the vehicle itself) and inter vehicle communication (between a vehicle itself and another vehicle) have been implemented so as to reduce traffic accidents.

A vehicle of a transmission source that is an information transmission source (hereinafter referred to as "transmission vehicle") often provides the safe driving support information used for these communication systems in one way to neighboring vehicles that are in a predetermined direction of and apart from the transmission source vehicle. For example, an emergency vehicle information provision support system expected to be one application of the inter vehicle communication provides information to vehicles that are present in an area 300 meters in front of an emergency vehicle that is a transmission vehicle.

In this communication system, microwaves are mainly used. However, high frequency radio waves such as microwaves have features in which the propagation distances are short and the diffraction losses are large. Thus, it may occasionally be difficult for a transmission vehicle to directly communicate with vehicles that are present in a predetermined transmission information target area (hereinafter referred to as "transmission destination area").

FIG. 1 is a schematic diagram showing a technique to enlarge the transmission destination area for a transmission vehicle. As shown in FIG. 1, vehicle B forwards transmission information transmitted from transmission vehicle A so as to enlarge a transmission destination area (hereinafter vehicle B is referred to as "forwarding vehicle").

When forwarding vehicle B receives a packet containing transmission information from transmission vehicle A, forwarding vehicle B also transmits the packet to the outside of the transmission destination area. If forwarding vehicle B repeats wasteful forwarding of the packet, communication traffic may increase and information may not be adequately transmitted.

On the other hand, the geocast routing technique that restricts an area to which a transmission packet is forwarded is known. FIG. 2 and FIG. 3 show examples of areas specified by the geocast routing technique.

FIG. 2 is a conceptual diagram in which a specified square area is set up using four-point position coordinates according to the geocast routing technique. FIG. 3 is a conceptual diagram in which a specified circular area is set up using center coordinates and a radius according to the geocast routing technique.

Patent Literature 1 describes an example of a radio network system according to the geocast routing technique that sets up a specified area using parameters that represent the forwarding direction of a packet and the effective width of an area to which the packet is forwarded.

In the radio network system described in Patent Literature 1, a terminal unit that is a transmission source uses the parameters, which represent the forwarding direction of the packet and the effective width of the area to which the packet is forwarded (hereinafter these parameters are referred to as "specified parameters"), adds the parameters to the packet, and transmits the packet. When a forwarding terminal unit receives the packet from the terminal unit that is the transmission source, the forwarding terminal unit determines whether or not its current position is present in the specified area that corresponds to the specified parameters. If the current position of the forwarding terminal unit is not present in the specified area, the forwarding terminal unit does not forward the packet.

Thus, this radio network system can decrease the number of forwarding times that forwarding vehicles forward the packet and thereby reduce of packet transmission congestion.

RELATED ART LITERATURE

Patent Literature

Patent Literature 1: JP2008-176370A, Publication

SUMMARY OF THE INVENTION

Problem to be Solved by the Invention

In the radio network system described in Patent Literature 1, the terminal unit that is the transmission source adds specified parameters to a packet so as to prevent unnecessary forwarding of the packet. However, since a vehicle having the terminal unit that is the transmission source runs on roads having curves and so forth, the specified area set up by the specified parameters may become different from the expected area. With reference to FIG. 4, an example in which the geocast routing technique is applied to an emergency vehicle information provision support system will be described.

FIG. 4 is a schematic diagram showing that an area that is 300 m in front of an emergency vehicle is set up as a specified area according to the geocast routing technique. As shown in FIG. 4, when the emergency vehicle that is a transmission vehicle is approaching a curve, the specified area deviates from the expected transmission area. As a result, a problem in which the packet is not forwarded to the expected area occurs.

As a technique that forwards a packet that has been set up for a specified area that corresponds to the trajectory of a road that differs from the specified area, it is contemplated that forwarding vehicles store road trajectory information such as map information and update the specified area based on the road trajectory information. In this case, however, every forwarding vehicles need to store the latest road trajectory information. Unless the road trajectory information is stored, it is difficult to correct the specified area that corresponds to the trajectories of the roads. In addition, a problem in which the forwarding vehicles need to execute a complicated matching process that matches the trajectories of the roads and specified areas will occur.

An object of the present invention is to provide a communication device, a communication system, and a communication method that can solve the foregoing problems.

Means that Solve the Problem

A communication device of the present invention is a communication device mounted on a vehicle including: reception means that receives a packet containing forwarding information that represents a transmission area of the packet that is set up based on a reference direction from a transmission source; acquisition means that acquires a running direction of the vehicle; and processing means that transmits the packet containing said forwarding information to at least the transmission area of the packet that has been set up based on a running direction of its own vehicle.

A communication system of the present invention is a communication system having a plurality of communication devices mounted on respective vehicles, wherein a communication device of a transmission source of said plurality of communication devices transmits a packet containing forwarding information that represents a transmission area of the packet that is set up based on a reference direction, and wherein each of other communication devices of said plurality of communication devices includes:

reception means that receives the packet containing said forwarding information from said transmission source; acquisition means that acquires a running direction of its own vehicle; and processing means that transmits the packet containing said forwarding information at least to the transmission area of the packet that has been set up based on the running direction of said vehicle itself.

A communication method of the present invention is a communication method for a communication device mounted on a vehicle, comprising: receiving a packet containing forwarding information that represents a transmission area of the packet that is set up based on a reference direction from a transmission source; acquiring a running direction of its own vehicle; and transmitting the packet containing said forwarding information to at least the transmission area of the packet that has been set up based on the running direction of said vehicle itself.

A communication method of the present invention is a communication method for a communication system having a plurality of communication devices mounted on respective vehicles, comprising: causing a communication device of a transmission source of said plurality of communication devices to transmit a packet containing forwarding information that represents a transmission area of the packet that is set up based on a reference direction; causing other communication devices of said plurality of communication devices to receive the packet containing said forwarding information from said transmission source; causing said other communication devices to acquire a running direction of its own vehicle; and causing said other communication devices to transmit the packet containing said forwarding information to at least the transmission area of the packet that has been set up based on the running direction of said vehicle itself.

Effect of the Invention

According to the present invention, a packet that corresponds to the trajectories of roads can be forwarded without it being necessary to use road trajectory information.

BRIEF DESCRIPTION OF DRAWINGS

FIG. 6 is a schematic diagram showing an example of a data format of a packet containing forwarding information.

FIG. 8 is a schematic diagram showing the structure of a packet that contains forwarding information and that is transmitted from a communication device.

FIG. 10 is a schematic diagram showing a packet containing forwarding information that represents a forwarding count value of the packet and a forwarding count threshold of the packet.

FIG. 11A is a schematic diagram showing the structure of an orientation cast packet header.

FIG. 11B is a schematic diagram showing the structure of fields of the orientation cast packet header.

FIG. 12A is a schematic diagram showing the structure of a common header.

FIG. 12B is a schematic diagram showing the structure of fields of the common header.

FIG. 13B is a schematic diagram showing the structure of fields of a long position information common header.

BEST MODES THAT CARRY OUT THE INVENTION

Next, with reference to the accompanying drawings, embodiments of the present invention will be described.

Figure 5:
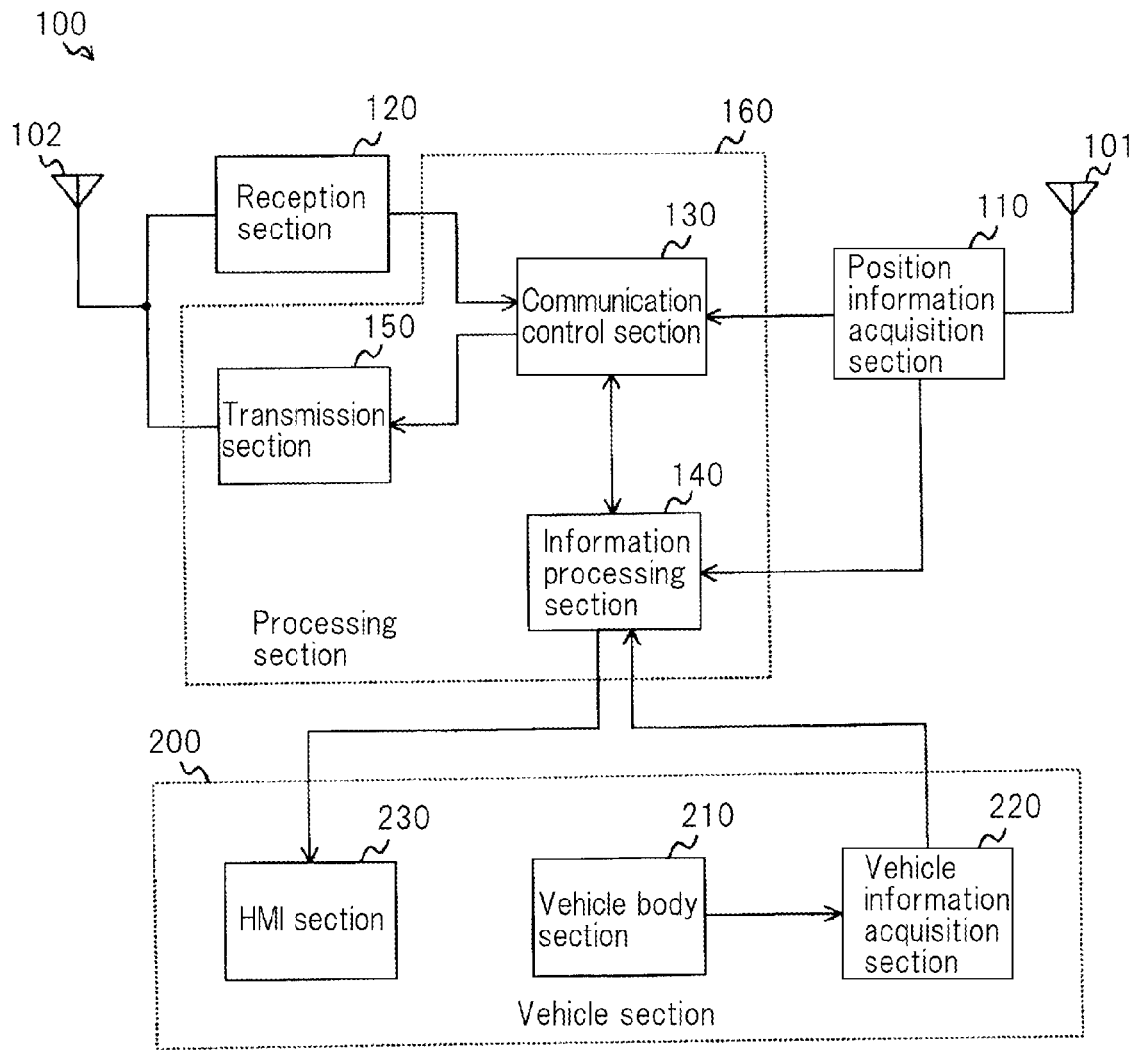
FIG. 5 is a block diagram showing the structure of a communication device according to an embodiment of the present invention.

FIG. 5 is a block diagram showing an example of the structure of a communication device according to an embodiment of the present invention.

Communication device 100 is an on-board device mounted on vehicle section 200 and performs road-to-vehicle communication and inter vehicle communication. Communication device 100 is provided with position information acquisition section 110, reception section 120, and processing section 160. Processing section 160 is provided with communication control section 130, information processing section 140, and transmission section 150.

Reception section 120 can be generally referred to as reception means.

Reception section 120 receives packets transmitted by other communication devices through antenna 102. Reception section 120 receives data packet from the transmission source of a packet containing forwarding information that represents a packet transmission area that has been set up based on the running direction of the vehicle that is the transmission source of the packet.

According to this embodiment, reception section 120 receives from the transmission source of a packet containing forwarding information that represents a reference position, a reference direction, a transmission direction of the packet, an angle threshold, a forwarding distance threshold, and a position of the transmission source of the packet. The transmission source of the packet is an on-board communication device that initially transmits a packet containing the forwarding information.

FIG. 6 is a schematic diagram showing an example of the data format of a packet containing forwarding information.

The forwarding information contained in a packet represents the position of the transmission source referred to as reference position Pb, the running direction of the transmission source referred to as reference direction Db, transmission direction Dr of the packet set up based on reference direction Db, angle threshold θt, forwarding distance threshold Lt, and position P1 of the transmission source.

Reference direction Db, transmission direction Dr of the packet, angle threshold θt, and forwarding distance threshold Lt are used to represent the transmission area of the packet transmission source. Transmission direction Dr of the packet is set up in the same direction (the forward direction of the vehicle) as or the opposite direction (the reverse direction of the vehicle) to the running direction of the vehicle.

Reference position Pb is used to represent the forwarding direction from the transmission source of the packet to the vehicle itself. Position P1 of the transmission source is used to acquire the forwarding distance of the packet. Reference position Pb and position P1 of the transmission source are represented by longitude and latitude.

When reception section 120 shown in FIG. 5 receives a packet containing forwarding information, reception section 120 supplies the packet containing the forwarding information to information processing section 140 located in processing section 160 through communication control section 130.

Position information acquisition section 110 can be generally referred to as acquisition means.

Position information acquisition section 110 acquires position information that represents the position of communication device 100 through antenna 101. The position of communication device 100 is hereinafter referred to as "position of the vehicle itself." The position of the own vehicle is represented by latitude, longitude, and elevation. Position information acquisition section 110 acquires position information using GPS (Global Positioning System).

In addition, position information acquisition section 110 acquires running direction information that represents the running direction of vehicle section 200. The running direction of vehicle section 200 is hereinafter referred to as "a running direction of the vehicle itself." Position information acquisition section 110 acquires position information at intervals of a predetermined period of time and thereby acquires running direction information using a plurality of pieces of position information acquired at different timings.

Position information acquisition section 110 acquires the direction in which vehicle section 200 has run based on the just acquired position information and past acquired position information as the running direction of its own vehicle. Position information acquisition section 110 acquires information that represents the running direction of its own vehicle as running direction information.

Alternatively, position information acquisition section 110 may detect the running direction of vehicle section 200 using a acceleration sensor such as a gyro sensor and acquire information that represents the running direction as running direction information. Position information acquisition section 110 supplies the position information and running direction information to communication control section 130 and information processing section 140.

Processing section 160 can be generally referred to as processing means.

When processing section 160 receives a packet containing forwarding information that represents the transmission area of the transmission source that has been set up based on the running direction of the transmission source of the packet, processing section 160 receives running direction information that represents the running direction of its own vehicle from position information acquisition section 110 and uses the running direction of its own vehicle represented by the running direction information as the reference direction of the own vehicle.

Processing section 160 transmits a packet containing forwarding information in all directions of its own vehicle such that the packet is transmitted at least to the transmission area of the packet that has been set up based on the running direction of its own vehicle represented by the running direction information.

According to this embodiment, when processing section 160 receives a packet containing forwarding information from reception section 120, processing section 160 acquires the position information that represents the position of its own vehicle and the running direction information that represents the running direction of its own vehicle. Thereafter, processing section 160 determines whether or not the position of its own vehicle represented by the position information is present in the transmission area of the transmission source represented by the forwarding information contained in the packet.

If the position of its own vehicle is not present in the transmission area of the transmission source, processing section 160 prevents forwarding of the packet containing the forwarding information. In contrast, if the position of its own vehicle is present in the transmission area of the transmission source, processing section 160 changes reference direction Db of the transmission source represented by the forwarding information contained in the packet from the running direction of the transmission source to the running direction of its own vehicle, changes reference position Pb represented by the forwarding information from the position of the transmission source to the position of its own vehicle, and transmits a packet containing the changed forwarding information at least to a packet transmission area that has been set up based on the running direction of its own vehicle represented by the running direction information.

Communication control section 130 can be generally referred to as control means.

When communication control section 130 receives a packet containing forwarding information that represents the transmission area of the transmission source of the packet from reception section 120, communication control section 130 acquires position information that represents the position of its own vehicle and running direction information that represents the running direction of its own vehicle. Communication control section 130 determines whether or not the position of the own vehicle represented by the position information is present in the transmission area of the transmission source represented by forwarding information contained in packets received from the transmission source.

If communication control section 130 has determined that the position of its own vehicle is not present in the transmission area of the transmission source, communication control section 130 prevents forwarding of the packet containing the forwarding information. Alternatively, if communication control section 130 has determined that the position of its own vehicle is not present in the transmission area of the transmission source, communication control section 130 may discard the packet containing the forwarding information.

In contrast, if communication control section 130 has determined that the position of the own vehicle is present in the transmission area of the transmission source, communication control section 130 forwards the packet containing the forwarding information. However, if the running direction of the own vehicle represented by the running direction information is opposite to the running direction of the transmission source represented by the forwarding information, communication control section 130 may not forward the packet.

According to this embodiment, communication control section 130 acquires the forwarding direction of the packet forwarded from the position of the transmission source referred to as reference position Pb represented by the forwarding information contained in the packet to the position of the own vehicle represented by the position information. In addition, communication control section 130 calculates the angle between the forwarding direction of the packet and the transmission direction of the transmission source that is the transmission direction of the packet represented by the running direction of the transmission source referred to as reference direction Db represented by the forwarding information (hereinafter this angle is referred to as "forwarding angle").

Communication control section 130 determines whether or not the forwarding angle exceeds angle threshold θt represented by the forwarding information. If the forwarding information does not represent angle threshold θt, communication control section 130 determines whether or not the forwarding angle exceeds a predetermined angle determination threshold, for example 90 degrees. In this case, the angle determination threshold is pre-stored for example in communication control section 130.

If the forwarding angle exceeds angle threshold θt, communication control section 130 determines that the position of the own vehicle is not present in the transmission area of the transmission source. In contrast, if the forwarding angle does not exceed the angle threshold, communication control section 130 calculates the distance between the position of the transmission source represented by the forwarding information and the position of the own vehicle represented by the position information (hereinafter this distance is referred to as "arrival distance"). Thereafter, communication control section 130 determines whether or not the arrival distance exceeds forwarding distance threshold Lt represented by the forwarding information.

If the arrival distance exceeds forwarding distance threshold Lt, communication control section 130 determines that the position of the its vehicle is not present in the transmission area of the transmission source. In contrast, if the arrival distance does not exceed forwarding distance threshold Lt and if the forwarding angle does not exceed angle threshold θt, communication control section 130 determines that the position of its own vehicle is present in the transmission area of the transmission source.

If reference position Pb represented by the forwarding information represents "elevation of transmission source," communication control section 130 may determine whether or not the difference between the elevation of the transmission source and the elevation of its own vehicle represented by the position information exceeds a predetermined elevation difference threshold. If the elevation difference exceeds the elevation difference threshold, communication control section 130 determines that its own vehicle and the vehicle of the transmission source are not present on the same road and thereby the position of its own vehicle is not present in the transmission area of the transmission source. In this case, the elevation difference threshold is pre-stored, for example, in communication control section 130.

If communication control section 130 has determined that the position of its own vehicle is present in the transmission area of the transmission source, communication control section 130 supplies the forwarding information contained in the packet, the position information, and the running direction information to information processing section 140.

Information processing section 140 can be generally referred to as changing means.

Information processing section 140 receives from communication control section 130 the forwarding information that represents the running direction of the transmission source referred to as reference direction Db of the transmission source and the position of the transmission source referred to as reference position Pb, the position information that represents the position of its own vehicle, and the running direction information that represents the running direction of its own vehicle. Thereafter, information processing section 140 changes reference direction Db of the transmission source represented by the forwarding information from the running direction of the transmission source to the running direction of its own vehicle and also changes reference position Pb represented by the forwarding information from the position of the transmission source to the position of its own vehicle.

When information processing section 140 changes reference direction Db and reference position Pb represented by the forwarding information, information processing section 140 outputs the changed forwarding information to communication control section 130. Thereafter, communication control section 130 generates a packet containing the changed forwarding information and outputs the packet to transmission section 150. In addition to the forwarding information, the packet also contains emergency information that denotes that an emergency vehicle is approaching, information processing section 140 supplies the emergency information to vehicle section 200.

Transmission section 150 can be generally referred to as transmission means.

When transmission section 150 receives the packet containing the changed forwarding information from communication control section 130, transmission section 150 transmits the packet containing the changed forwarding information as a radio signal in all directions of its own vehicle through antenna 102.

When vehicle section 200 receives emergency information from information processing section 140, vehicle section 200 notifies the driver of the emergency information. According to this embodiment, vehicle section 200 is provided with vehicle body section 210, vehicle information acquisition section 220, and HMI section 230.

Vehicle body section 210 is a vehicle that the driver drives on roads.

Vehicle information acquisition section 220 acquires vehicle information with respect to the state of vehicle body section 210. Vehicle information acquisition section 220 supplies the vehicle information to information processing section 140.

When HMI (Human Machine Interface) section 230 receives emergency information from information processing section 140, HMI section 230 notifies the driver of the emergency information.

Next, a packet forwarding technique that the communication system that has a plurality of communication devices 100 uses will be described.

Figure 7:
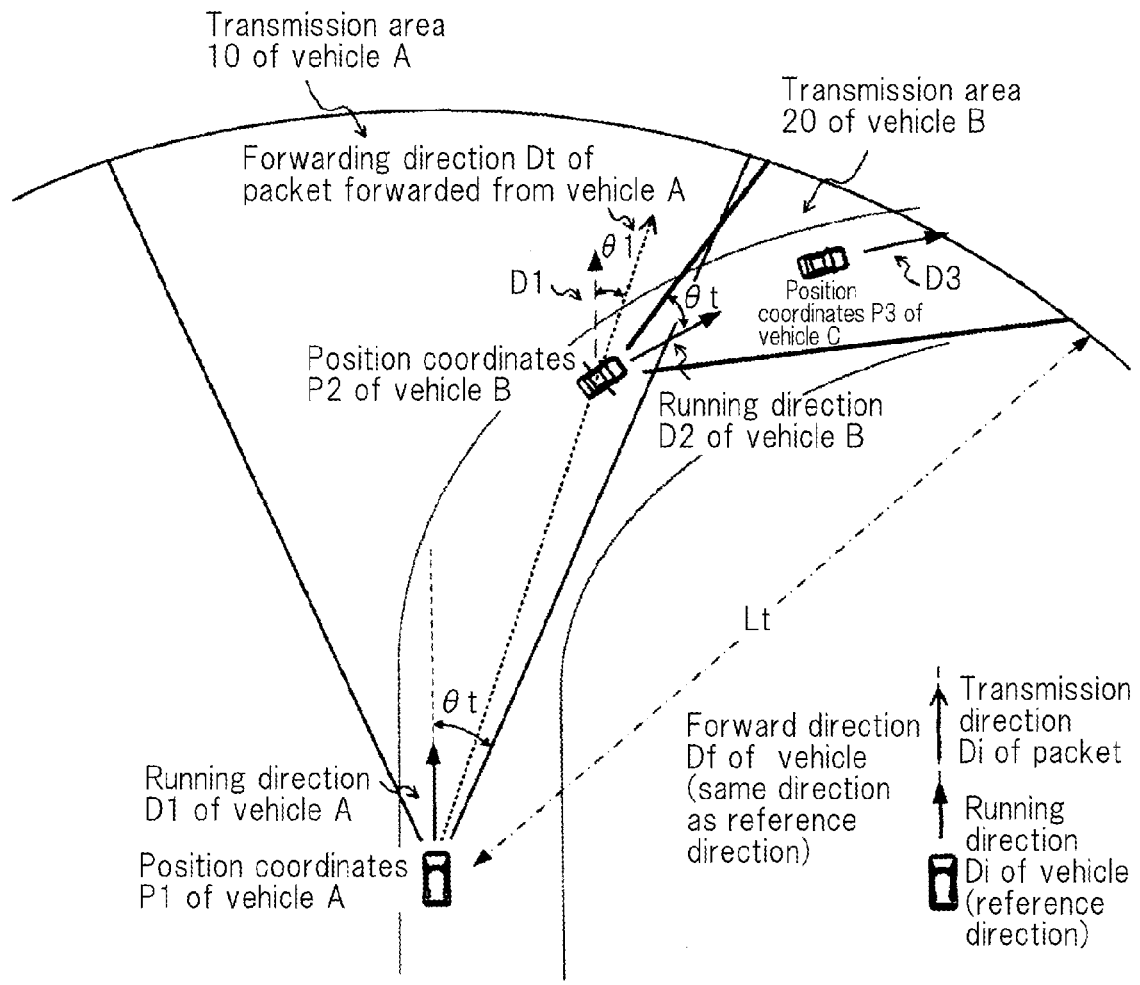
FIG. 7 is a schematic diagram showing a packet forwarding state in a communication system composed of a plurality of communication devices mounted on respective vehicles.

FIG. 7 is a schematic diagram showing packet forwarding performed by the communication system composed of vehicles A to C each provided with communication device 100. It is assumed that vehicle A is an emergency vehicle and vehicles B and C are ordinary vehicles.

FIG. 7 shows position coordinates P1 of vehicle A that is running in front of a curve of a road; and position coordinates P2 and P3 of vehicles B and C that are running on the curve of the road.

Communication device 100 of vehicle A is a transmission source that initially transmits a packet containing forwarding information.

In communication device 100 of vehicle A, information processing section 140 outputs emergency information, transmission direction information that represents the transmission area of the emergency information, angle threshold θt, and forwarding distance threshold Lt so as to transmit the emergency information that denotes that an emergency vehicle is approaching. In this example, information processing section 140 outputs transmission direction information that represents "forward direction Df of the vehicle." Thus, the transmission direction of vehicle A is set up in the same direction as running direction D1 of vehicle A.

When communication control section 130 receives the emergency information, transmission direction information, angle threshold θt, and forwarding distance threshold Lt from information processing section 140, position information acquisition section 110 supplies the position information that represents position P1 of vehicle A and the running direction information that represents running direction D1 of vehicle A to communication control section 130 under the control thereof.

Communication control section 130 stores position information that represents position P1 of vehicle A in fields of position P1 of the transmission source and reference position Db represented by the forwarding information, stores the running direction information that represents running direction D1 of vehicle A in a field of reference direction Db represented by the forwarding information, stores the transmission direction information in a field of transmission direction Dr of the packet represented by the forwarding information, and stores relevant information in fields of angle threshold θt and forwarding distance threshold Lt. In such a manner, communication control section 130 generates the forwarding information that represents transmission area 10 of vehicle A. In addition, communication control section 130 generates a packet containing the forwarding information and emergency information and then transmission section 150 transmits the packet containing the forwarding information and emergency information.

FIG. 8 shows packet 510 containing forwarding information transmitted by communication device 100 of vehicle A.

In communication device 100 of vehicle B, when reception section 120 receives a packet containing forwarding information that represents transmission area 10 of vehicle A, position information acquisition section 110 supplies position information that represents position P2 of vehicle B and running direction information that represents running direction D2 of vehicle B to communication control section 130 under the control thereof.

When communication control section 130 receives a packet containing forwarding information from reception section 120 and also receives position information that represents position P2 of vehicle B and running direction information that represents running direction D2 of vehicle B from position information acquisition section 110, communication control section 130 determines whether or not position P2 of vehicle B is present in transmission area 10 of vehicle A represented by the forwarding information.

Specifically, communication control section 130 acquires forwarding direction Dt of the packet forwarded from position P1 of the transmission source represented by the forwarding information contained in the packet to position P2 of its own vehicle represented by the position information. In addition, communication control section 130 acquires forwarding angle θ1 between forwarding direction Dt of the packet and transmission direction D1 of vehicle A represented by the forwarding information and determines whether or not forwarding angle θ1 exceeds angle threshold θt represented by the forwarding information.

In FIG. 7, since forwarding angle θ1 does not exceed angle threshold θt, communication control section 130 calculates the arrival distance of the packet from position P1 of the transmission source represented by the forwarding information to position P2 of vehicle B represented by the position information and determines whether or not the arrival distance exceeds forwarding distance threshold Lt represented by the forwarding information.

In FIG. 7, since the arrival distance of the packet does not exceed forwarding distance threshold Lt, communication control section 130 determines that the position of vehicle B is present in transmission area 10 of vehicle A.

If communication control section 130 has determined that the position of vehicle B is present in transmission area 10 of vehicle A, information processing section 140 receives forwarding information that represents position P1 of vehicle A referred to as the reference position and running direction D1 of vehicle A referred to as the reference direction, position information that represents position P2 of vehicle B, and running direction information that represents running direction D2 of vehicle B. Thereafter, information processing section 140 changes reference position Pb represented by the forwarding information from position P1 of vehicle A to position P2 of vehicle B. Moreover, information processing section 140 changes reference direction Db represented by the forwarding information from running direction D1of vehicle A to running direction D2 of vehicle B.

After having changed both reference position Pb and reference direction Db represented by the forwarding information, information processing section 140 supplies the changed forwarding information to communication control section 130. Thereafter, communication control section 130 generates a packet containing the changed forwarding information and then transmission section 150 transmits the packet containing the changed forwarding information.

FIG. 8 shows packet 520 containing the forwarding information transmitted by communication device 100 of vehicle B.

In communication device 100 of vehicle C, when reception section 120 receives the packet containing the forwarding information that represents transmission area 20 of vehicle B, position information acquisition section 110 supplies position information that represents position P3 of vehicle C and running direction information that represents running direction D3 of vehicle C to communication control section 130 under the control thereof.

When communication control section 130 receives the packet containing the forwarding information that represents transmission area 20 of vehicle B from reception section 120 and also receives the position information that represents position P3 of vehicle C and the running direction information that represents running direction D3 of vehicle C from position information acquisition section 110, communication control section 130 determines whether or not position P3 of vehicle C represented by the position information is present in transmission area 20 of vehicle B represented by the forwarding information.

Specifically, communication control section 130 acquires the forwarding direction of the packet forwarded from position P2 of the transmission source represented by the forwarding information contained in the packet to position P3 of its own vehicle represented by the position information. In addition, communication control section 130 specifies running direction D2 of vehicle B based on reference direction D2 represented by the forwarding information. Thereafter, communication control section 130 acquires the forwarding angle between running direction D2 of vehicle B and the forwarding direction of the packet and determines whether or not the forwarding angle exceeds angle threshold θt represented by the forwarding information.

In FIG. 7, since the forwarding angle of the packet does not exceed angle threshold θt, communication control section 130 calculates the arrival distance of the packet between position P1 of the transmission source represented by the forwarding information and position P3 of its own vehicle represented by the position information and determines whether or not the arrival distance exceeds forwarding distance threshold Lt represented by the forwarding information.

In FIG. 7, since the arrival distance does not exceed forwarding distance threshold Lt, communication control section 130 determines that position P3 of vehicle C is present in transmission area 20 of vehicle B. If communication control section 130 has determined that position P3 of vehicle C is present in transmission area 20 of vehicle B, information processing section 140 receives the forwarding information represents running direction D2 of vehicle B referred to as reference direction Db and position P2 of vehicle B referred to as reference position Pb, the position information that represents position P3 of vehicle C, and the running direction information that represents running direction D3 of vehicle C.

Thereafter, communication control section 130 changes reference position Pb represented by the forwarding information from position P2 of vehicle B to position P3 of vehicle C and also changes reference direction Db represented by the forwarding information from running direction D2 of vehicle B to running direction D3 of vehicle C. Thus, transmission area 20 of vehicle B is changed to the transmission area of vehicle C.

When both reference position Pb and reference direction Db represented by the forwarding information are changed, information processing section 140 supplies the changed forwarding information to communication control section 130. Communication control section 130 generates a packet containing the changed forwarding information and then transmission section 150 transmits the packet containing the changed forwarding information.

FIG. 8 shows packet 530 containing the forwarding information transmitted by communication device 100 of vehicle C.

Next, the operation of communication device 100 will be described.

Figure 9:
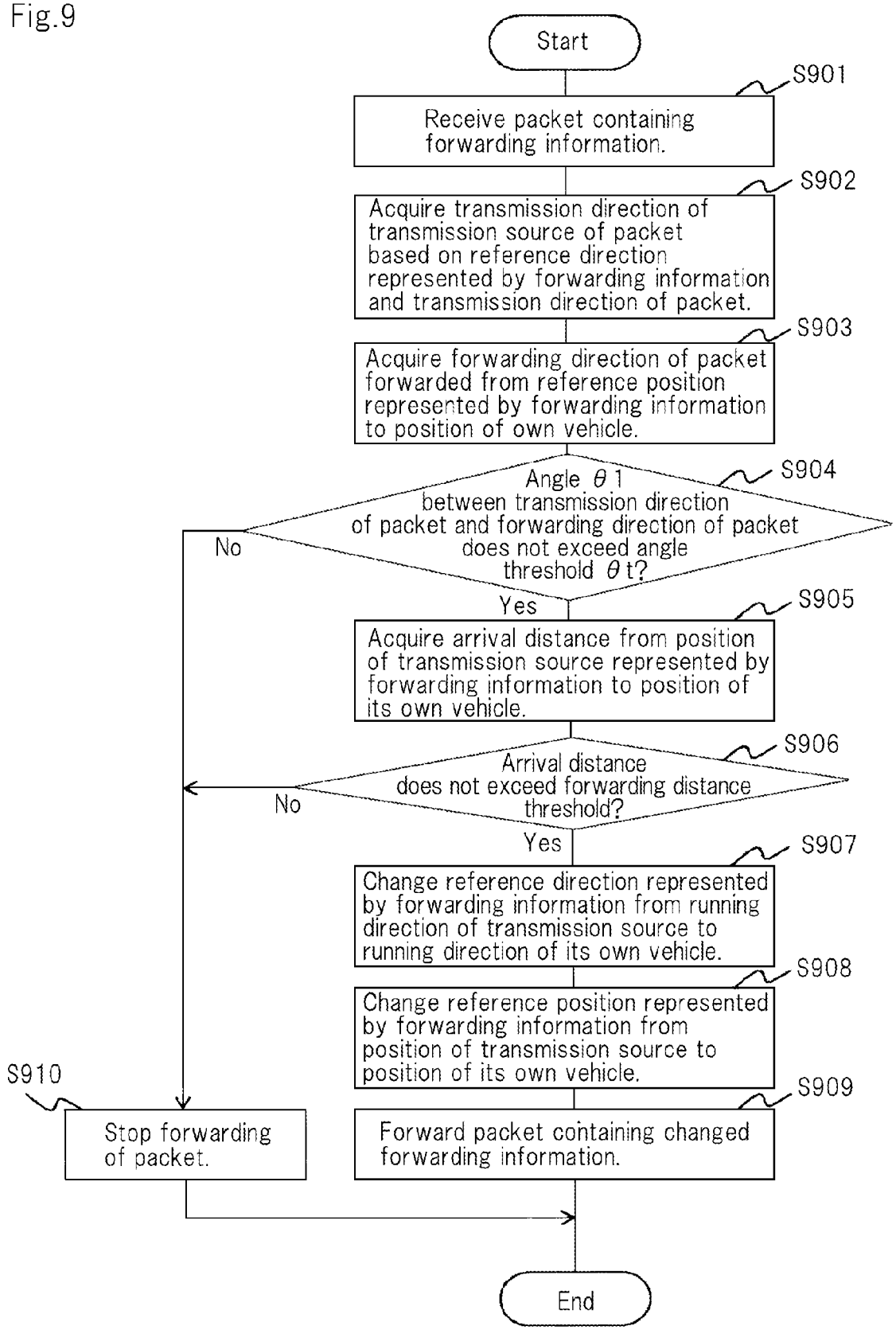
FIG. 9 is a flow chart showing a communication process performed by the communication device.

FIG. 9 is a flow chart showing an example of a procedure of a communication method performed by communication device 100.

First, reception section 120 receives from the transmission source a packet containing forwarding information that represents the transmission area of the packet that has been set up based on the running direction of the transmission source of the packet (at step S901).

When reception section 120 receives the packet containing the forwarding information, position information acquisition section 110 outputs position information that represents the position of its own vehicle and running direction information that represents the running direction of its own vehicle under the control of communication control section 130. Communication control section 130 receives the packet containing the forwarding information from reception section 120 and also receives the position information and running direction information from position information acquisition section 110.

Communication control section 130 acquires the transmission direction of the transmission source based on reference direction Db represented by the forwarding information contained in the packet (at step S902). In addition, communication control section 130 acquires the forwarding information of the packet forwarded from the position of the transmission source represented by the forwarding information to the position of its own vehicle represented by the position information (at step S903).

Communication control section 130 determines whether or not forwarding angle θ1 between the forwarding direction of the packet and the transmission direction of the transmission source represented by the forwarding information exceeds angle threshold θt represented by the forwarding information (at step S904).

If forwarding angle θ1 exceeds angle threshold θt, communication control section 130 determines that the position of its own vehicle is not present in the transmission area of the transmission source of the packet and then stops (suppresses) forwarding of the packet (at step S910).

In contrast, if forwarding angle θ1 does not exceed angle threshold Δt, communication control section 130 acquires the arrival distance from position P1 of the transmission source represented by the forwarding information to the position of its own vehicle represented by the position information (at step S905). Thereafter, communication control section 130 determines whether or not the arrival distance of the packet exceeds forwarding distance threshold Lt (at step S906). If the arrival distance of the packet exceeds forwarding distance threshold Lt, communication control section 130 determines that the position of the own vehicle is not present in the transmission area of the transmission source and thereby stops forwarding of the packet (at step S910).

In contrast, if the arrival distance of the packet does not exceed forwarding distance threshold Lt and if forwarding angle θ1 does not exceed angle threshold θt, communication control section 130 determines that the position of its own vehicle is present in the transmission area of the transmission source and then supplies the forwarding information contained in the packet, the position information that represents the position of the own vehicle, and the running direction information that represents the running direction of its own vehicle to information processing section 140.

Information processing section 140 changes reference direction Db represented by the forwarding information from the running direction of the transmission source to the running direction of its own vehicle (at step S907) and also changes reference position Pb represented by the forwarding information from the position of the transmission source to the position of its own vehicle (at step S908). Thereafter, transmission section 150 forwards the packet containing the changed forwarding information (at step S909) and then completes the process of communication device 100.

Next, an example of the operation of communication device 100 of a vehicle that is running on a lane that is opposite to a lane on which a vehicle that is a transmission source is running.

When reception section 120 receives a packet containing forwarding information from a transmission source, position information acquisition section 110 outputs position information that represents the position of its own vehicle and running direction information that represents the running direction of its own vehicle to communication control section 130 under the control thereof.

Communication control section 130 acquires the forwarding direction of the packet forwarded from the position of the transmission source represented by the forwarding information to the position of its own vehicle represented by the position information and determines whether or not forwarding angle θ between the forwarding direction of the packet and the transmission direction of the transmission source represented by the forwarding information satisfies the condition given, for example, by formula 1 that follows.

$$\theta < \theta t \text{ or } 180 - \theta < \theta t \qquad \text{Formula 1}$$

If forwarding angle θ satisfies formula 1 and if the opposite direction of the running direction of its own vehicle is closer to the transmission direction of the transmission source than the running direction of its own vehicle represented by the running direction information, communication control section 130 generates reference direction information that represents the opposite direction of the running direction of its own vehicle.

If forwarding angle θ satisfies formula 1 and if the arrival distance of the packet does not exceed forwarding distance threshold Lt, communication control section 130 determines that the position of its own vehicle is present in the transmission area of the transmission source and thereby outputs the forwarding information that represents the running direction of the transmission source referred to as the reference direction and the position of the transmission source referred to as the reference position, the reference direction information that represents the opposite direction of the running direction of its own vehicle, and the position information that represents the position of its own vehicle to information processing section 140.

Information processing section 140 changes the reference direction represented by the forwarding information from the running direction of the transmission source to the opposite direction of the running direction of its own vehicle and also changes the reference position represented by the forwarding information to the position of its own vehicle. Thereafter, transmission section 150 forwards the packet containing the changed forwarding information.

According to this embodiment, in communication device 100 mounted on vehicle section 200, when reception section 120 receives from the transmission source the packet containing the forwarding information that represents the transmission area of the packet that has been set up based on the reference direction that is the running direction of the transmission source of the packet, position information acquisition section 110 acquires the running direction of its own vehicle. Thereafter, processing section 160 transmits the packet containing the forwarding information at least to the transmission area of the packet that has been set up based on the running direction of its own vehicle.

Thus, when communication device 100 changes the transmission area of the packet that has been set up based on the running direction of the transmission source of the packet to that based on the running direction of its own vehicle, communication device 100 can change the transmission area of the packet corresponding to the trajectory of the road. As a result, communication device 100 can correct the transmission area of the packet corresponding to the trajectory of the road without need to use road trajectory information such as map information.

In addition, according to this embodiment, when reception section 120 receives the forwarding information that represents the running direction of the transmission source referred to as the reference direction of the transmission source of the packet from the transmission source, position information acquisition section 110 acquires the position information that represents the position of its own vehicle. Thereafter, communication control section 130 determines whether or not the position of its own vehicle represented by the position information is present in the transmission area of the transmission source represented by the forwarding information contained in the packet transmitted from the transmission source. If the position of its own vehicle is not present in the transmission area of the transmission source, communication control section 130 prevents forwarding of the packet. In contrast, if the position of its own vehicle is present in the transmission area of the transmission source, information processing section 140 changes the reference direction of the transmission source represented by the forwarding information from the running direction of the transmission source to the running direction of its own vehicle and then transmission section 150 transmits the packet containing the changed forwarding information to at least the transmission area of the packet that has been set up based on the running direction of its own vehicle.

Thus, when the position of its own vehicle is present in the transmission area of the transmission source, communication device 100 changes the forwarding information based on the running direction of its own vehicle and then transmits the packet containing the changed forwarding information. Thus, even if the transmission source transmits a packet containing forwarding information that represents a transmission area that does not match the trajectory of the road, communication device 100 can transmit a packet corresponding to the trajectory of the road. As a result, communication device 100 can forward a packet using a simple process rather than a complicated matching process that matches the transmission area with the trajectory of the road based on the road trajectory information.

Thus, while preventing unnecessary forwarding of a packet, communication device 100 can forward a packet corresponding to the trajectory of the road. In addition, when communication device 100 of the transmission source transmits a packet containing forwarding information, communication device 100 can transmit information to a desired transmission area through a simple setting rather than a complicated setting for a transmission area based on the trajectory of the road.

In addition, according to this embodiment, reception section 120 receives from the transmission source a packet containing forwarding information that represents the running direction of the transmission source referred to as the reference direction of the transmission source, the transmission direction of the packet transmission source, the angle threshold in the transmission direction of the transmission source, and the position of the transmission source. As a result, communication control section 130 acquires the forwarding direction of the packet forwarded from the position of the transmission source represented by the forwarding information to the position of its own vehicle. If the forwarding angle between the forwarding direction and the transmission direction of the transmission source exceeds the angle threshold, communication control section 130 prevents forwarding of the packet. In contrast, if the forwarding angle does not exceed the angle threshold, information processing section 140 changes the reference direction of the transmission source represented by the forwarding information from the running direction of the transmission source to the running direction of its own vehicle and also changes the position of the transmission source represented by the forwarding information to the position of its own vehicle.

Thus, if the forwarding angle between the forwarding direction and the transmission direction of the transmission source exceeds the angle threshold, communication device 100 prevents forwarding of the packet. As a result, communication device 100 of the transmission source can set up the angle threshold represented by the forwarding information so as to restrict the width of the transmission area of the packet. Thus, when communication device 100 of the transmission source uses a small angle threshold, communication device 100 can reduce unnecessary forwarding of a packet and prevent packet congestion from occurring.

In addition, according to this embodiment, when reception section 120 receives a packet containing forwarding information that represents not only the position of the transmission source of the packet, but also the forwarding distance threshold of the packet, if the arrival distance from the position of the transmission source represented by the forwarding information to the position of its own vehicle, communication control section 130 prevents forwarding of the packet.

Thus, if the forwarding distance of the packet forwarded from the position of the transmission source exceeds the forwarding distance threshold, communication device 100 can prevent unnecessary forwarding of a packet.

In addition, according to this embodiment, if the running direction of its own vehicle is opposite to the running direction of the transmission source represented by the forwarding information, processing section 160 prevents forwarding of the packet. Thus, communication device 100 of a vehicle that is running on an opposite lane can prevent transmitting of a packet containing forwarding information that has been changed based on the running direction of its own vehicle.

According to this embodiment, a placket that contains forwarding information that represents a forwarding count of the packet and a forwarding count threshold of the packet may be used.

FIG. 10 is a schematic diagram showing a packet containing forwarding information that represents forwarding count value Cv of the packet and forwarding count threshold Ht of the packet.

In FIG. 10, in communication device 100 of the transmission source, information processing section 140 outputs emergency information, transmission direction information, angle threshold θt, forwarding distance threshold Lt, forwarding count value Cv of the packet (for example, five times), and forwarding count threshold Ht of the packet (for example, 0 times).

When communication control section 130 receives the emergency information, transmission direction information, angle threshold θt, forwarding distance threshold Lt, forwarding count value Cv, and forwarding count threshold Ht, position information acquisition section 110 supplies the position information that represents the position of its own vehicle and the running direction information that represents the running direction of its own vehicle to communication control section 130 under the control thereof.

Thereafter, communication control section 130 stores the position information that represents the position of its own vehicle in the fields of position Db of the transmission source and reference position Pb represented by the forwarding information, stores the running direction information that represents the running direction of its own vehicle in the field of the reference direction represented by the forwarding information, stores the transmission direction information in the field of transmission direction Dr of the packet represented by the forwarding information, and stores relevant information in the fields of angle threshold θt and forwarding distance threshold Lt represented by the forwarding information. In addition, communication control section 130 stores relevant information in the fields of forwarding count value Cv and forwarding count threshold Ht represented by the forwarding information. Forwarding count value Cv is greater than forwarding count threshold Ht.

In such a manner, communication control section 130 generates forwarding information that represents the transmission area of the transmission source. Thereafter, communication control section 130 generates a packet containing the forwarding information and emergency information and then transmission section 150 transmits the packet containing the forwarding information and emergency information.

In communication device 100 of the forwarding vehicle, when reception section 120 receives the packet containing forwarding information that represents the transmission area of the transmission source, position information acquisition section 110 supplies the position information that represents the position of its own vehicle and the running direction information that represents the running direction of its own vehicle to communication control section 130 under the control thereof.

When communication control section 130 receives the packet containing the forwarding information from reception section 120 and also receives the position information and running direction information from position information acquisition section 110, communication control section 130 determines whether or not the position of its own vehicle represented by the position information is present in the transmission area of the transmission source represented by the forwarding information.

Communication control section 130 acquires the forwarding direction of the packet forwarded from position Pb of the transmission source represented by the forwarding information to the position of its own vehicle represented by the position information. If the forwarding angle between the forwarding direction and the transmission direction of the transmission source represented by the forwarding information exceeds angle threshold θt represented by the forwarding information, if the arrival distance from position P1 of the transmission source represented by the forwarding information to the position of its own vehicle represented by the position information exceeds forwarding distance threshold Lt represented by the forwarding information, or if forwarding count value Cv represented by the forwarding information becomes forwarding count threshold Ht represented by the forwarding information, communication control section 130 determines that the position of its own vehicle is not present in the transmission area of the transmission source and thereby prevents forwarding of the packet.

If the forwarding angle does not exceed angle threshold θt, if the arrival distance does not exceed forwarding distance threshold Lt, and if forwarding count value Cv represented by the forwarding information does not become forwarding count threshold Ht, communication control section 130 determines that the position of its own vehicle is present in the transmission area of the transmission source. Thereafter, communication control section 130 supplies the forwarding information that represents position Pb of the transmission source and running direction Db of the transmission source, the position information that represents the position of the own vehicle, and the running direction information that represents the running direction of its own vehicle to information processing section 140.

Thereafter, information processing section 140 changes position Pb of transmission source represented by the forwarding information to the position of its own vehicle and changes running direction Db of the transmission source represented by the forwarding information to the running direction of the transmission source. In addition, since forwarding count value Cv represented by the forwarding information is greater than forwarding count threshold Ht, information processing section 140 counts down forwarding count value Cv represented by the forwarding information by one. If forwarding count value Cv is smaller than forwarding count threshold Ht, information processing section 140 counts up forwarding count value Cv represented by the forwarding information by one.

Thus, since the communication system that has a plurality of communication devices 100 uses a packet containing forwarding information that represents forwarding count value Cv and forwarding count threshold Ht, the communication system can restrict the number of forwarding times of a packet that contains forwarding information. Thus, if communication device 100 of a vehicle that is running in an area where a traffic jam occurs transmits a packet containing forwarding information, communication device 100 can be prevented from unnecessarily forwarding a packet containing forwarding information in an area where a traffic jam occurs. Alternatively, according to this embodiment, forwarding information that represents any one of angle threshold θt, forwarding distance threshold Lt, and forwarding count threshold Ht may be used.

In addition, according to this embodiment, an example in which communication device 100 of the transmission source transmits a packet containing forwarding information to a vehicle that is running in front of its own vehicle was described. Alternatively, a packet containing forwarding information may be transmitted to a vehicle that is running behind its own vehicle.

For example, in a safe driving support system that uses inter vehicle communication, each vehicle transmits safe driving support information that represents the state of its own vehicle to neighboring vehicles. Each vehicle that receives the safe driving support information determines whether there is a risk of head-to-head collision based on the received safe driving support information. If each vehicle has determined that there is such a risk, the vehicle itself notifies the driver of the risk. In this case, communication device 100 of the transmission source transmits the safe driving support information to a vehicle that is running in front of it so as to notify the neighboring vehicles that it is present. On the other hand, to prevent a vehicle that is running behind it from colliding with it, it needs to notify the vehicle that is running behind it of such information.

Thus, communication device 100 of the transmission source may be set up so as to transmit the packet in the forward direction of the vehicle. However, if the driver of this vehicle treads on the brake pedal or if communication device 100 detects a speed reduction greater than a predetermined threshold, communication device 100 may transmit the packet in the rear direction of the vehicle. As a result, packet congestion can be reduced compared to the case in which communication device 100 always transmits the safe driving support information in the forward and rear directions of the vehicle.

According to this embodiment, an example in which forwarding information representing the running direction of the transmission source referred to as the reference direction was described. Alternatively, the running direction of the transmission source may be calculated based on the position of the transmission source referred to as the reference position represented by the forwarding information contained in the packet. In this case, communication device 100 of the transmission source transmits a packet containing forwarding information at intervals of a predetermined period of time. In communication device 100 of the forwarding vehicle, when reception section 120 receives a packet that is transmitted at intervals of the predetermined period of time from the transmission source, communication control section 130 calculates the running direction of the transmission source referred to as the reference direction based on the position of the transmission source represented by the forwarding information contained in the packet that is received by reception section 120 and the position of the transmission source represented by the forwarding information contained in another packet that was received by reception section 120 before the former packet is received.

Specifically, a message that contains an orientation cast packet header shown in FIG. 11A is transmitted and received. FIG. 11B shows the structure of fields of a common header of the orientation cast packet. The rest of the packet is referred to as extension header.

Figure 13A:
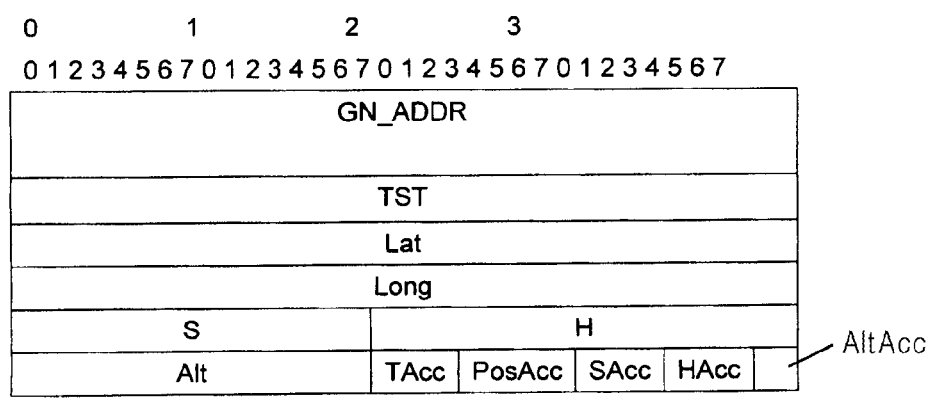
FIG. 13A is a schematic diagram showing the structure of long position information (long position vector).

FIG. 12A is a schematic diagram showing the structure of the common header, FIG. 12B is a schematic diagram showing the structure of fields of the common header, FIG. 13A is a schematic diagram showing the structure of long position information (long position vector), and FIG. 13B is a schematic diagram showing the structure of fields of the common header of the long position information.

Figure 2:
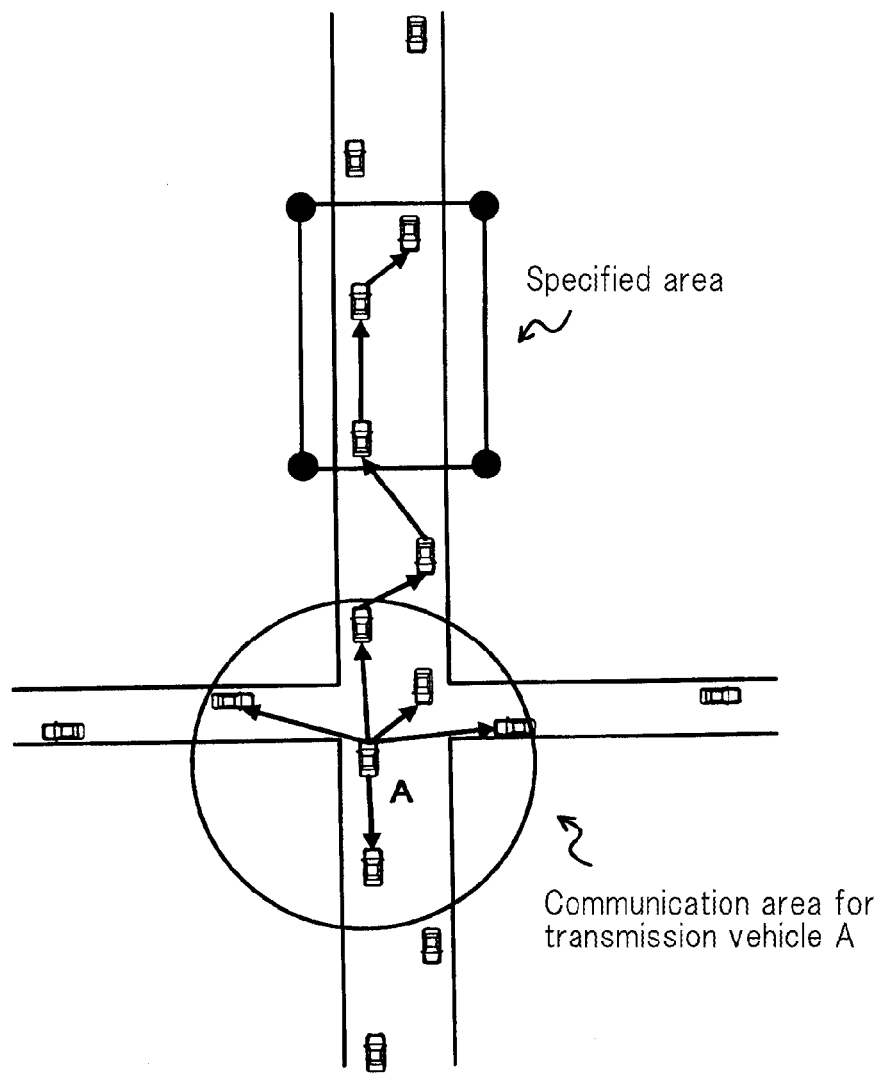
FIG. 2 is a schematic diagram showing a state in which a specified square area is set up using four-point position coordinates according to the geocast routing technique.
Figure 3:
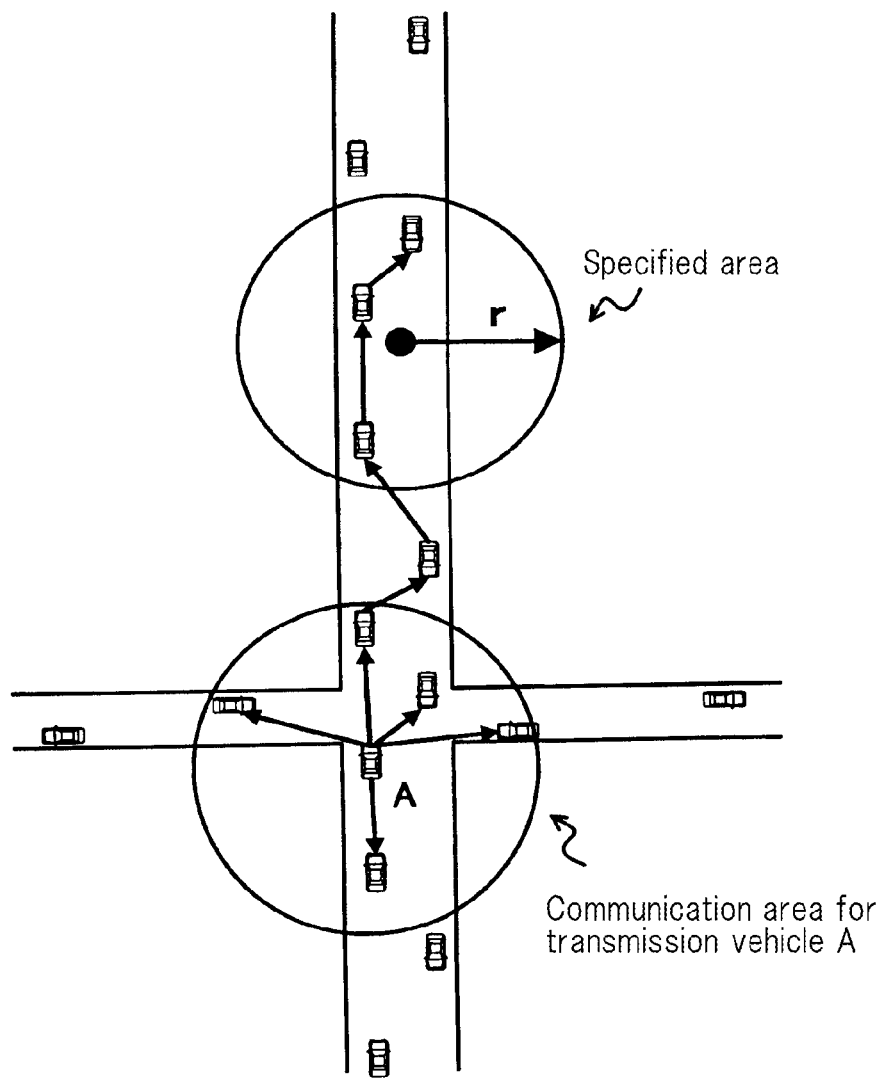
FIG. 3 is a schematic diagram showing a state in which a specified circular area is set up using center coordinates and a radius according to the geocast routing technique.
Figure 4:
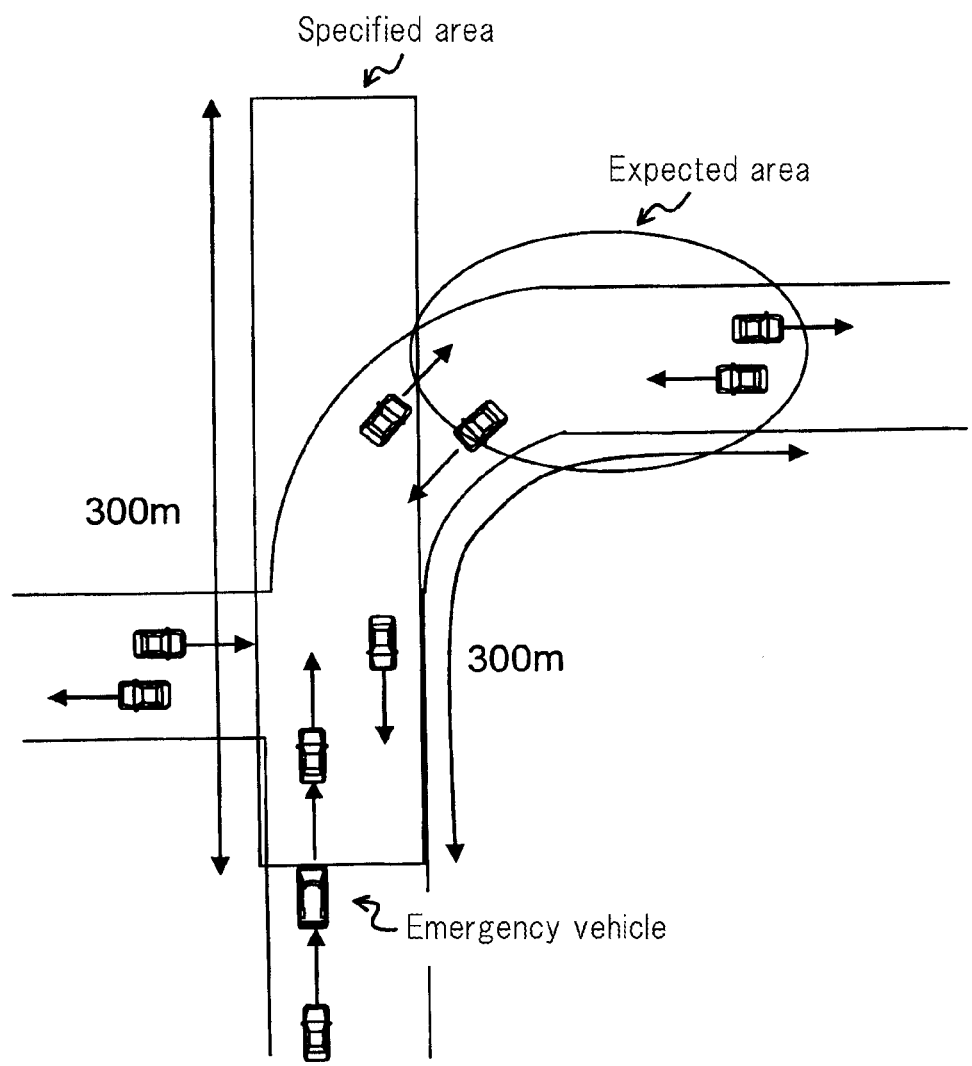
FIG. 4 is a schematic diagram showing a state in which an area 300 m in front of an emergency vehicle is set up as a specified area according to the geocast routing technique.

The values shown in FIG. 2 and FIG. 6 have the following relationship. A vehicle that initially transmits a packet is referred to as transmission source (SO: Source), whereas a forwarding vehicle that transmits a packet is referred to as transmission source (SE: Sender).

Reference position (position of transmission source) Pb: SE PV in FIG. 12A and FIG. 12B; A in FIG. 13A; and Lat and Long in FIG. 13B.

Reference direction (running direction of transmission source) Db: SE PV in FIG. 12A and FIG. 12B; H in FIG. 13A and FIG. 13B.

Transmission direction Dr of packet: Direction in FIG. 11A and FIG. 11B

Angle threshold θt: Angle in FIG. 11A and FIG. 11B

Forwarding distance threshold Lt: Distance in FIG. 11A and FIG. 11B

Position of transmission source (latitude and longitude): SO PV in FIG. 11A and FIG. 11B; A in FIG. 13A; Lat and Long in FIG. 13B Transmission method of packet of transmission source (SO):

The forward or reverse of the vehicle, transmission distance, and transmission angle are set up. Assuming that the running direction of the vehicle is 0 deg, an angle of 1 to 90 degrees to the left or right is set up. If the angle is 90 deg, all forward directions or all reverse direction are set up. The other parameters shown in FIG. 11B of the packet are set up and then the packet is transmitted.

Method to determine whether or not a forwarding vehicle and a reception vehicle can receive a packet:

1. The distance between the vehicle of transmission source (SO) and the receiving vehicle is calculated based on position information. If the distance is equal to or greater than Distance shown in FIG. 11, the packet will not be received.

2. If the angle between the direction connecting the position of the transmission source (SE) and the position of its own vehicle and if the direction of the vehicle of the transmission source (SO) is equal to or greater than Angle shown in FIG. 11, the packet will not be received. For details, refer to the note that follows.

Figure 1:
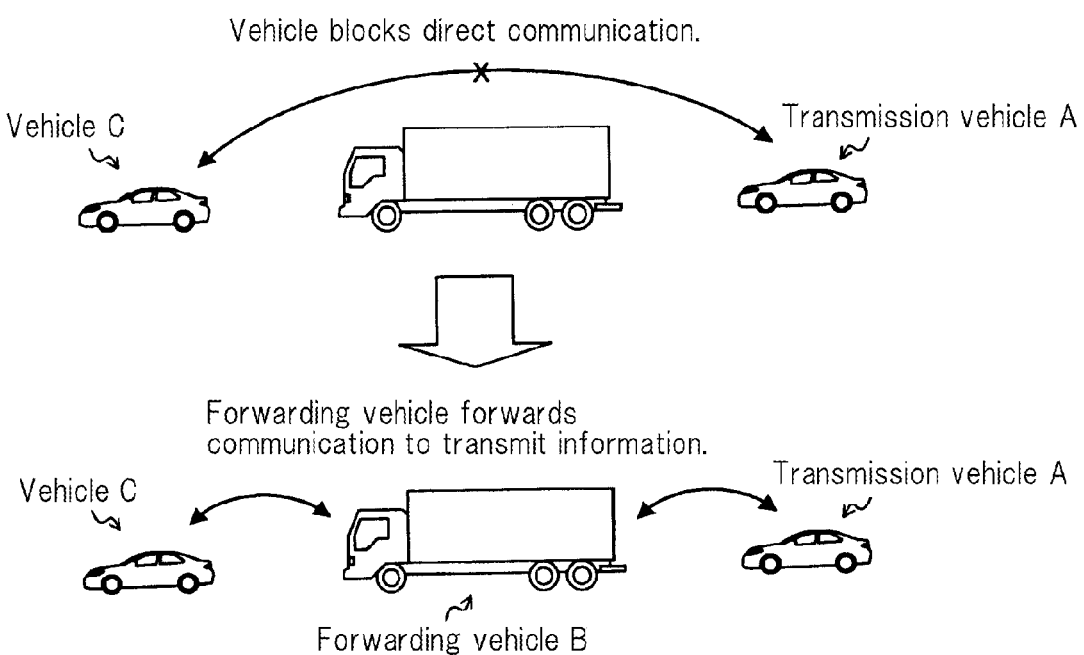
FIG. 1 is a schematic diagram showing an example of a technique that enlarges a transmission destination area for a transmission vehicle.

3. If the angle between the direction of the vehicle of the transmission source (SE) and the direction of the receiving vehicle is 180° or greater, the packet is not received. If the foregoing conditions are satisfied, the packet will be received. If the number of hops does not become the upper limit, the number of hops is decremented by 1, SE PV shown in FIG. 1 is changed to information of the own vehicle and then the packet is retransmitted.

Note:

Assuming that the latitude and longitude of position information of the vehicle of the transmission source (SE) are $(x_1, y_1)$ and those of the receiving vehicle are $(x_2, y_2)$, and the direction of the transmission source (SE) is $h1°$, angle $\phi$ between the direction (vector) a connecting the position of the transmission source (SE) and the position of the receiving vehicle and the direction (vector) b of the transmission source (SE) can be acquired by the following formula. Angle $\phi$ needs to be equal to or smaller than Angle shown in FIG. 11.

$$\vec{a} \cdot \vec{b} = |a||b|\cos \phi \quad \text{[Mathematical Expression 1]}$$

With the following values, angle $\phi$ can be acquired.

$$\vec{a} = (\cos h_1 \cdot x_1, \sin h_1 \cdot y_1)$$

$$\vec{b} = (x_2 \cdot x_1, y_2 \cdot y_1)$$

$$|a| = \sqrt{((\cos h_1 \cdot x_1)^2 + (\sin h_1 \cdot y_1)^2)}$$

$$|b| = \sqrt{((x_2 \cdot x_1)^2 + (y_2 \cdot y_1)^2)} \quad \text{[Mathematical Expression 2]}$$

With reference to the embodiments, the present invention has been described. The illustrated structures are just examples. Thus, the present invention is not limited to such structures.

The present application claims priority based on Japanese Patent Application JP 2011-018532 filed on Jan. 31, 2011, the entire contents of which are incorporated herein by reference in its entirety.

DESCRIPTION OF REFERENCE NUMERALS

100 Communication device
110 Position information acquisition section
120 Reception section
130 Communication control section
140 Information processing section
150 Transmission section
160 Processing section
200 Vehicle section
210 Vehicle body section
220 Vehicle information acquisition section
230 HMI section

The invention claimed is:

1. A communication device mounted on a vehicle, comprising:
reception means that receives a packet containing forwarding information that represents a transmission area of the packet that is set up based on a reference direction from a transmission source;
acquisition means that acquires a running direction of its own vehicle; and
processing means that transmits the packet containing said forwarding information to at least the transmission area of the packet that has been set up based on the running direction of said own vehicle,
wherein said forwarding information further represents a running direction of said transmission source based on said reference direction of said transmission source,
wherein said acquisition means acquires the position of its own vehicle, and
wherein said processing means includes:
control means that determines whether or not the position of said vehicle itself is present in a transmission area of said transmission source represented by the forwarding information contained in the packet transmitted from said transmission source and suppresses forwarding of said packet if the position of said vehicle itself is not present in the transmission area of said transmission source;
changing means that changes the reference direction of said transmission source represented by said forwarding information from the running direction of said transmission source to the running direction of its own vehicle if the position of said vehicle itself is present in the transmission area of said transmission source; and
transmission means that transmits the packet containing the forwarding information that has been changed by said changing means to at least the transmission area of the packet that has been set up based on the running direction of said vehicle itself.

2. The communication device as set forth in claim 1,
wherein said forwarding information further represents a transmission direction of said packet transmitted by the transmission source, an angle threshold to the transmission direction of said transmission source, and a position of said transmission source,
wherein said control means acquires the forwarding direction of the packet forwarded from the position of said transmission source represented by said forwarding information to the position of said vehicle itself and prevents forwarding of said packet if the angle between the forwarding direction and the transmission direction of said transmission source represented by said forwarding information exceeds said angle threshold represented by said forwarding information, and
wherein said changing means changes the reference direction of said transmission source represented by said forwarding information from the running direction of said transmission source to the running direction of its own vehicle and changes the position of the transmission source represented by said forwarding information to the position of its own vehicle if said angle does not exceed said angle threshold.

3. The communication device as set forth in claim 1,
wherein said forwarding information further represents the position of said transmission source and a forwarding distance threshold of said packet, and
wherein said control means prevents forwarding of said packet if an arrival distance from the position of said transmission source represented by said forwarding information to the position of said vehicle itself exceeds said forwarding distance threshold.

4. The communication device as set forth in claim 1,
wherein said forwarding information further represents a forwarding count value of said packet and a forwarding count threshold of said packet, and
wherein said control means prevents forwarding of said packet if said forwarding count value represented by said forwarding information becomes said forwarding count threshold represented by said forwarding information.

5. The communication device as set forth in claim 4,
wherein said changing means changes said forwarding count value represented by said forwarding information if said forwarding count value represented by said forwarding information does not become said forwarding count threshold.

6. The communication device as set forth in claim 1,
wherein said forwarding information further represents a transmission direction of said packet transmitted by said transmission source, an angle threshold in the transmission direction of said transmission source, a position of said transmission source, a forwarding distance threshold of said packet, a forwarding count value of said packet, and a forwarding count threshold of said packet, and
wherein said control means acquires the forwarding direction of said packet from the position of said transmission source represented by said forwarding information to the position of said vehicle itself and prevents forwarding of said packet if the angle between the forwarding direction and the transmission direction of said transmission source represented by said forwarding information exceeds said angle threshold represented by said forwarding information, if an arrival distance from the position of said transmission source represented by said forwarding information to the position of said vehicle itself exceeds said forward distance threshold represented by said forwarding information, or if said forwarding count value represented by said forwarding information becomes the forwarding count threshold represented by said forwarding information.

7. The communication device as set forth in claim 1,
wherein said processing means prevents forwarding of said packet if the running direction of its own vehicle is opposite to the running direction of the vehicle of said transmission source represented by said forwarding information.

8. A communication system having a plurality of communication devices mounted on respective vehicles,
wherein a communication device of a transmission source of said plurality of communication devices transmits a packet containing forwarding information that represents a transmission area of the packet that is set up based on a reference direction, and
wherein each of other communication devices of said plurality of communication devices includes:
reception means that receives the packet containing said forwarding information from said transmission source;
acquisition means that acquires a running direction of its own vehicle; and
processing means that transmits the packet containing said forwarding information to at least the transmission area of the packet that has been set up based on the running direction of said own vehicle itself,
wherein said forwarding information further represents a running direction of said transmission source based on said reference direction of said transmission source,
wherein said acquisition means acquires the position of its own vehicle, and
wherein said processing means includes:
control means that determines whether or not the position of said vehicle itself is present in a transmission area of said transmission source represented by the forwarding information contained in the packet transmitted from said transmission source and suppresses forwarding of said packet if the position of said vehicle itself is not present in the transmission area of said transmission source;
changing means that changes the reference direction of said transmission source represented by said forwarding information from the running direction of said transmission source to the running direction of its own vehicle if the position of said vehicle itself is present in the transmission area of said transmission source; and
transmission means that transmits the packet containing the forwarding information that has been changed by said changing means to at least the transmission area of the packet that has been set up based on the running direction of said vehicle itself.

9. A communication method for a communication device mounted on a vehicle, comprising:
receiving a packet containing forwarding information that represents a transmission area of the packet that is set up based on a reference direction from a transmission source;
acquiring a running direction of an own vehicle; and
transmitting the packet containing said forwarding information at least to the transmission area of the packet that has been set up based on the running direction of said own vehicle,
wherein said forwarding information further represents a running direction of said transmission source based on said reference direction of said transmission source,
wherein said acquiring the running direction comprises acquiring the position of its own vehicle, and
wherein transmitting the packet includes:
determining whether or not the position of said vehicle itself is present in a transmission area of said transmission source represented by the forwarding information contained in the packet transmitted from said transmission source and suppressing forwarding of said packet if the position of said vehicle itself is not present in the transmission area of said transmission source;
changing the reference direction of said transmission source represented by said forwarding information from the running direction of said transmission source to the running direction of its own vehicle if the position of said vehicle itself is present in the transmission area of said transmission source; and
transmitting the packet containing the forwarding information that has been changed to at least the transmission area of the packet that has been set up based on the running direction of said vehicle itself.

10. A communication method for a communication system having a plurality of communication devices mounted on respective vehicles, comprising:
causing a communication device of a transmission source of said plurality of communication devices to transmit a packet containing forwarding information that represents a transmission area of the packet that is set up based on a reference direction;
causing other communication devices of said plurality of communication devices to receive the packet containing said forwarding information from said transmission source;
causing said other communication devices to acquire a running direction of its own vehicle; and
causing said other communication devices to transmit the packet containing said forwarding information to at least the transmission area of the packet that has been set up based on the running direction of said vehicle itself, wherein said forwarding information further represents a running direction of said transmission source based on said reference direction of said transmission source, wherein said acquiring the running direction comprises acquiring the position of its own vehicle, and wherein transmitting the packet includes:

determining whether or not the position of said vehicle itself is present in a transmission area of said transmission source represented by the forwarding information contained in the packet transmitted from said transmission source and suppressing forwarding of said packet if the position of said vehicle itself is not present in the transmission area of said transmission source;

changing the reference direction of said transmission source represented by said forwarding information from the running direction of said transmission source to the running direction of its own vehicle if the position of said vehicle itself is present in the transmission area of said transmission source; and transmitting the packet containing the forwarding information that has been changed to at least the transmission area of the packet that has been set up based on the running direction of said vehicle itself.

\* \* \* \* \*